United States Patent [19]

Zenner et al.

[11] Patent Number: 5,202,052

[45] Date of Patent: Apr. 13, 1993

[54] AMINO POLYCARBOXYLIC ACID COMPOUNDS AS OXYGEN SCAVENGERS

[75] Inventors: Bruce D. Zenner, Alameda, Calif.; Fred N. Teumac, Conyngham, Pa.; Larrie A. Deardurff, Alameda, Calif.; Bert A. Ross, Conyngham, Pa.

[73] Assignee: Aquanautics Corporation, Alameda, Calif.

[21] Appl. No.: 581,507

[22] Filed: Sep. 12, 1990

[51] Int. Cl.$^5$ ............................................. C09K 15/16
[52] U.S. Cl. ............................ 252/188.28; 252/400.1; 252/400.53; 252/399; 252/405
[58] Field of Search ...................................... 252/188.28

[56] References Cited

U.S. PATENT DOCUMENTS

| | | | |
|---|---|---|---|
| 3,135,019 | 6/1964 | Aichele | 18/5 |
| 3,360,827 | 1/1968 | Aichele | 18/20 |
| 3,547,746 | 12/1970 | Gwinner | 161/2 |
| 3,577,595 | 5/1971 | Smith et al. | 18/20 |
| 3,586,514 | 6/1971 | Vljbrief | 99/171 |
| 4,048,361 | 9/1977 | Valyi | 428/35 |
| 4,211,681 | 7/1980 | Braun et al. | 260/29.2 R |
| 4,278,718 | 7/1981 | Billings et al. | 428/64 |
| 4,279,350 | 7/1981 | King | 215/228 |
| 4,287,995 | 9/1981 | Morita et al. | 215/228 |
| 4,380,597 | 4/1983 | Erwied et al. | 524/109 |
| 4,384,972 | 5/1983 | Nakamura et al. | 252/188.21 |
| 4,510,162 | 4/1985 | Nezat | 426/124 |
| 4,524,015 | 6/1985 | Takahashi et al. | 252/188.28 |
| 4,536,409 | 8/1985 | Farrell et al. | 426/398 |
| 4,652,435 | 3/1987 | Natsuume et al. | 252/188.28 |
| 4,702,966 | 10/1987 | Farrell et al. | 428/500 |
| 4,752,002 | 6/1988 | Takahashi et al. | 206/204 |
| 4,756,436 | 7/1988 | Morita et al. | 215/228 |
| 4,820,442 | 4/1989 | Motoyama et al. | 252/188.28 |
| 4,888,032 | 12/1989 | Busch | 252/188.28 |
| 4,908,151 | 3/1990 | Inoue et al. | 252/188.28 |
| 4,942,048 | 7/1990 | Nasu et al. | 252/188.28 |
| 4,992,410 | 2/1991 | Cullen et al. | 252/188.28 |

FOREIGN PATENT DOCUMENTS

| | | |
|---|---|---|
| 301719 | 2/1989 | European Pat. Off. . |
| 328336 | 8/1989 | European Pat. Off. . |
| 328337 | 8/1989 | European Pat. Off. . |
| 54-022281 | 2/1979 | Japan . |
| 58-160344 | 9/1983 | Japan . |
| 61-238836 | 10/1986 | Japan . |
| 62-215010 | 9/1987 | Japan . |
| 2040889 | 9/1980 | United Kingdom . |

OTHER PUBLICATIONS

Pfizer Technical Information Data Sheet 684, *Chemistry of Erythorbates, Erythorbic Acid, Sodium Erythorbate*, Pfizer Chemical Division (1985).

Pfizer Technical Information Data Sheet 691, *Erythorbate as a Boiler Feedwater Oxygen Scavenger*, Pfizer Chemical Division (1986).

Pfizer Information Sheet 2091, *Erythorbates in Oil Recovery Applications*, Pfizer Oil Field Products Group (1986).

(List continued on next page.)

*Primary Examiner*—Richard D. Lovering
*Assistant Examiner*—Joseph D. Anthony
*Attorney, Agent, or Firm*—Townsend and Townsend

[57] ABSTRACT

An oxygen scavenging composition of a polymer which is permeable to both oxygen and water or water vapor, and an oxygen scavenging material of an amino polycarboxylic acid chelate or complex of a transition metal, or salt thereof, dispersed relatively uniformly throughout the polymer in an amount effective to act as an oxygen scavenger when activated for scavenging oxygen by contact with water or water vapor which permeates the polymer. A preferred oxygen scavenging compound is ferrous EDTA or salts thereof. Also, an ascorbate compound may be used as a preservative or augmenter for the oxygen scavenging compound.

23 Claims, 3 Drawing Sheets

OTHER PUBLICATIONS

Pfizer Technical Information Data Sheet 692, *Erythorbic Acid and Sodium Erythorbate in Foods*, Pfizer Chemical Division (1986).

Pfizer Information Sheet 2042, *Industrial Uses For Erythorbate and Ascorbates*, Pfizer Chemical Division.

Vitamins (Ascorbic Acid), Kirk Othmer Encyclopedia of Chemical Technology, vol. 29, pp. 8–35.

Food Additives (Antioxidants), Kirk–Othmer Encyclopedia of Chemical Technology, vol. 11, pp. 160–161.

Cort, Antioxidant Properties of Ascorbic Acid in Foods, Advances in Chemistry Series, No. 200, Ascorbic Acid: Chemistry, Metabolism and Uses, 1982, pp. 533–550.

Reinke et al, Effect of Antioxidants and Oxygen Scavengers on the Shelf Life of Canned Beer, A.S.B.C. Proceedings, 1963, pp. 175–180.

Thomson, Practical Control of Air in Beer, Brewer's Guild Journal, vol. 38, No. 451, May, 1952, pp. 167–184.

Von Hodenberg, Removal of Oxygen from Brewing Liquor, Brauwelt Int'l. III, 1988, pp. 243–244.

European Packaging Newsletter and World Report, vol. 21, No. 7, Jul. 1988.

Klimovitz, et al, The Impact of Various Antioxidants on Flavor Stability, MBAA Technical Quarterly, vol. 26, pp. 70–74, 1989.

Grey et al, Systematic Study of the Influence of Oxidation on Beer Flavor, A.S.B.C. Proceedings, 1948 pp. 101–112.

Folland, "The Oxbar Super-Barrier System: A Total Oxygen Barrier System for PET Packaging" presented at Europak '89 Oct. 1989, pp. 483–494.

A Review of the Technological Efficiency of Some Antioxidents and Synergists, by World Health Organization, 1972.

Oxygen Eliminator Extends Shelf Life, Packaging Technology 1989.

Extending the Life of a Bottle of Beer, New York Times, Mar. 29, 1989.

ZA-matic ® Model 1400 A, Zapata Industries, Inc.

AMINO POLYCARBOXYLIC ACID COMPOUNDS AS OXYGEN SCAVENGERS

TECHNICAL FIELD

The present invention relates to polymer compositions containing oxygen scavenging compounds therein, for use in packaging beverages, foods, pharmaceuticals and the like. In particular, these polymer compositions have utility as liners or gasketing materials for crowns, closures, lids or caps of various containers such as bottles or cans to prevent oxygen ingress and to scavenge oxygen which is present inside the container, or contained in outside air leaking past or permeating through the polymer composition. These polymer compositions may also be used in the construction of the container, as the container material itself or as a barrier layer thereupon, to prevent oxygen ingress therethrough or to scavenge oxygen therein.

BACKGROUND ART

In packaging oxygen sensitive materials such as foodstuffs, beverages, and pharmaceuticals (collectively "products") oxygen contamination can be particularly troublesome. Care is generally taken to minimize the introduction of oxygen or to reduce the detrimental or undesirable effects of oxygen on the foodstuff or beverage.

Molecular oxygen ($O_2$) can be reduced to a variety of intermediate species by the addition of one to four electrons; these species are superoxide, hydroxy radical, hydrogen peroxide, and water. $O_2$ and water are relatively unreactive: the three intermediate species are very reactive. Also, $O_2$ can be activated to singlet electron state oxygen (which can undergo subsequent reduction to the more reactive oxygen species) by irradiation, or by the presence of catalytic agents. These reactive oxygen species are free radical in nature, and the oxidative reactions in which they participate are therefore autocatalytic.

Carbon-carbon double bonds are particularly susceptible to reaction with the intermediate species. Such carbon-carbon bonds are often found in foods and beverages, pharmaceuticals, dyes, photochemicals, adhesives, and polymer precursors. Virtually any product which has complex organic constituents will contain such carbon-carbon double bonds or other oxygen reactive components, and hence can undergo oxidative reactions. Thus, if the oxidation products adversely affect the performance, odor or flavor of the product, then removing the oxygen which is present (either dissolved in or trapped with the product), preventing oxygen ingress, or inhibiting the reactions of oxygen will benefit the product.

A number of strategies exist to deal with oxygen as a contaminant. The most basic is simply to remove oxygen from the product by vacuum or by inert gas sparging, or both. Such systems are used in boiler water treatment, the orange juice and brewing industries, and in modified-atmosphere packaging of food products. This technology, while somewhat equipment intensive, can remove about 90-95% of the oxygen present in air from the product (or its container) prior to or during packaging. However, the removal of the remaining 5-10% of oxygen using this approach requires longer times for vacuum treatment and/or sparging and increasingly larger volumes of higher and higher purity inert gas, which must not itself be contaminated with trace levels of oxygen. This makes the removal (by such methods) of the last traces of oxygen expensive. A further disadvantage of these methods is a tendency to remove volatile product components. This is a particular problem with foods and beverages, wherein such components are often responsible for some or all of the aroma and flavor.

Herein, the term "oxygen scavenger" means materials or compounds which can remove oxygen from the interior of a closed package either (a) by reacting or combining with entrapped oxygen (or with oxygen diffusing or leaking into the package) or (b) by promoting an oxidation reaction yielding innocuous products. The term "antioxidants" means materials or compounds which, when added to the foodstuff or beverage itself, slow the rate of oxidation or otherwise reduce the undesirable effects of oxidation upon the foodstuff or beverage.

For example, it has been known since the 1930's that oxygen in beer adversely affects its flavor and stability. Amounts of oxygen as low as 0.1 to 0.2 ml per 355 ml container will, over time, cause darkening of the beer, an increase in chill-haze values and significant taste changes. Oxygen's effect on beer is so strongly detrimental that many brewers go to great lengths to remove it from the bottle during the filling process. One usual technique is to (1) remove the air (via vacuum) from a clean bottle; (2) fill the bottle with $CO_2$; (3) flow the beer down the bottle wall into the bottle thus displacing the $CO_2$; and (4) finally, to squirt a jet of high-pressure deoxygenated water into the bottle to cause the beer to over-foam just as the cap is put on (attempting thereby to displace the remaining headspace gases with the beer's own $CO_2$) In addition, production lines are run slowly, to minimize introduction of air (21% $O_2$) into the headspace just before capping. All this is expensive, and usually reduces the total $O_2$ concentration in the headspace to only about 200-400 parts per billion: the desired level is as close to zero as possible, but certainly below about 50 ppb. The 200-400 ppb achieved in the packaged product by careful brewers corresponds to approximately 50-100 microliters of oxygen per 355 ml bottle. Even this small quantity of oxygen is still considered to be one of the major limitations on quality and shelf life of beer today. None of these techniques remove or control (a) oxygen dissolved in the product (which will outgas into the headspace as the enclosed system comes to equilibrium), or (b) oxygen leakage into the package past the gasket/container interface, or (c) oxygen permeating through the gasket into the interior of the package. The present invention, while primarily directed at scavenging headspace $O_2$, also aids in removal of $O_2$ from these other 3 sources. Furthermore, it is known that free oxygen inside a package may yield very rapid degradation of the product, consequently a desired property of any scavenger is to remove most of the free oxygen as quickly as possible (i.e., ultimate $O_2$ absorption capability is subordinate to fast uptake kinetics).

Antioxidants (such as sulfur dioxide, trihydroxy butyrophenone, butylated hydroxy toluene and butylated hydroxy anisole) and oxygen scavengers (such as ascorbic acid, isoascorbic acid and glucose oxidase-catalase) have been used in an attempt to reduce the effects of oxygen contamination on beer (See, e.q., Reinke et al., "Effect of Antioxidants and Oxygen Scavengers on the Shelf-life of Canned Beer, "A.S.B.C.

Proceedings, 1963, pp. 175–180, Thomson, "Practical Control of Air in Beer", Brewer's Guild Journal, Vol. 38, No. 451, May, 1952, pp. 167–184, and von Hodenberg, "Removal of Oxygen from Brewing Liquor," Brauwelt International, III, 1988, pp. 243–4). The direct addition of such agents into beer has several disadvantages. Both sulfur dioxide and ascorbates, when added to beer, can result in production of off-flavors, thus negating the intended purpose of the addition. Many studies have been conducted on the effect of such agents on the flavor of beer. (See, e.g., Klimowitz et al., "The impact of Various Antioxidants on Flavor Stability," MBAA Technical Quarterly, Vol. 26, pp. 70–74, 1989 and Gray et al., "Systematic Study of the Influence of Oxidation on Beer Flavor," A.S.B.C. Proceedings, 1948, pp. 101–112.) Also, direct addition of such compounds to a food or beverage requires stating on the label that the product contains the additive. This is somewhat undesirable in today's era of "fresh" and "all-natural" products.

It is also known in the art to prepare plastic containers (e.g., for beer, other beverages and various foods) wherein a wall comprises, or includes a layer which comprises, a polymer, an oxidizable component having oxygen-scavenging properties, and a metal catalyst, for binding any oxygen penetrating the container wall (See, e.g., Folland, the OXBAR Super-Barrier System: A Total Oxygen Barrier System for PET Packaging, "EUROPAK '89, Oct. 30–Nov. 1, 1989, and European Patent Application 301,719). Also, U.S. Pat. No. 4,048,361 discloses a food container having at least one barrier layer which contains an oxygen "getter," while U.S. Pat. No. 3,586,514 discloses a thin wall polyvinyl chloride container wherein the plastic contains a quantity of an antioxidizing agent to reduce oxygen permeability therethrough, and Japanese patent application 58-160,344 discloses hollow moldings of a polyethylene terephthalate ("PET") with a meta-xylylene group containing polyamide resin. The containers described in these references are described as oxygen barriers which prevent or reduce the transmission of oxygen through the wall and into the container. Such products are generally more expensive than glass containers and are less likely to be recycled than glass or aluminum containers.

Attempts have been made to incorporate oxygen scavenging systems in a container crown or closure. For example, U.S. Pat. No. 4,279,350 discloses a closure liner which incorporates a catalyst disposed between an oxygen permeable barrier and a water absorbent backing layer. Another closure is disclosed in UK Patent Application 2,040,889. This closure is in the form of a stopper molded from ethylene vinyl acetate ("EVA") having a closed-cell foamed core (which may contain water and sulfur dioxide to act as an oxygen scavenger) and a liquid impervious skin. Also, European Patent Application 328,336 discloses a preformed container closure element, such as a cap, removable panel or liner, formed of a polymeric matrix containing an oxygen scavenger therein. Preferred scavengers include ascorbates or isoascorbates, and their scavenging properties are activated by pasteurising or sterilizing the element after it has been fitted onto a filled container. Similarly, European Patent Application 328,337 discloses a sealing composition for a container closure comprising a polymeric matrix material which is modified by the inclusion therein of an oxygen scavenger. These compositions may be in fluid or meltable form for application to a closure or to be present as a deposit on the closure in the form of a closure gasket. Ascorbates or isoascorbates, alone or in combination with sulfites, are preferred oxygen scavengers. Again, the scavenging properties of these compounds are activated by pasteurizing or sterilizing the deposit when sealing a container with the gasket on a closure or metal cap.

Ferrous oxide has been used commercially as an oxygen scavenger for food applications. It is currently manufactured in sachets or packets by a number of firms including Mitsubishi Gas Chemical, Inc., which markets it in a product known as AGELESS TM. (See, e.g., European Packaging Newsletter and World Report, Vol. 21, No. 7, July, 1988.) Such products may also contain ascorbates as an oxygen scavenging agent, per U.S. Pat. No. 4,752,002, which discloses a packaging train of a plurality of such packets. Also, U.S. Pat. No. 4,524,015 discloses the use of a granular mixture of an ascorbate or ascorbic acid, an alkali metal carbonate, an iron compound, carbon black, and water, and U.S. Pat. No. 4,384,972 discloses a foodstuff freshness keeping agent of a particulate composition that contains a salt of a metal, an alkali substance, a sulfite or other deliquescent compound, and optionally, ascorbic acid or a salt thereof.

While such products are effective at removing oxygen from within packages of breads, cookies, pasta, coffee and other relatively dry foodstuffs, they have significant drawbacks. They (a) are hygroscopic and water soluble to some extent, (b) do not function effectively in wet or moist environments, (c) function less effectively in high $CO_2$ environments, (e.g., inside beer containers), (d) must be carefully sequestered from air (or other oxygen-containing environments) until use in order to preserve their activity, and (e) require a sachet or packet, often of multilayer construction, for proper storage and handling of the oxygen scavenger.

U.S. Pat. Nos. 4,536,409 and 4,702,966 each disclose a multilayer wall construction for a polymeric container to be used to pack comestibles, wherein outer and inner layers are structural and protective layers positioned therebetween are materials designed to control the unwanted permeation of oxygen. Preferably, the outer and inner layers are olefinic and resistant to the transmission of water vapor at room temperature, but at elevated temperatures, they permit water vapor to permeate into the oxygen absorbing system to trigger such system to an active state which is capable of absorbing oxygen. While this construction is useful from the standpoint of retaining the oxygen absorbing system in a dormant state until it is needed, such construction requires heat to render the inner and outer layers permeable to water vapor which can trigger or activate the oxygen absorbing system.

Consequently, there is a need for a material or product which can rapidly reduce oxygen levels inside a package of products which are wet or moist (or which are capable of generating moisture inside their packaging) without adversely changing taste, aroma, or functionality of such packaged foodstuffs, beverages and pharmaceuticals. Persons skilled in the art have considered the addition of various agents into the packaging of such products in an attempt to meet this need.

Japanese patent application 61-238,836 discloses a packaging film made from a thermoplastic such as low density polyethylene ("PE"), which includes ascorbic acid alone or in combination with an aliphatic polycarboxylic acid. This film is disclosed as having good gas barrier properties.

Japanese patent application 54-022,281 discloses a fruit tray made of a thermoplastic foam base having a thin layer of ascorbic acid or erythorbic acid (or one of their alkali metal salts) on the face of indentations in the tray upon which the fruit is to be placed.

New oxygen absorbing and scavenging materials are also being developed by Aquanautics, Inc., Alameda, Calif. (See Packaging Technology, "Oxygen Eliminator Extends Shelf Life," 1989 and "Extending the Life of a Bottle of Beer," New York Times, 3/29/89). These materials are transition metal complexes, particularly (but not exclusively) those complexes formed between transition metals and "polyalkylamines" (as disclosed in U.S. Pat. No. 4,959,135, which is expressly incorporated herein by reference thereto), as well as those complexes formed between transition metals and "macrocyclic amines" (as disclosed in U.S. Pat. No. 4,952,289, which is expressly incorporated herein by reference thereto).

These "amine+metal" complexes can bind ligands such as oxygen and can be used as oxygen scavengers in packaging. The complexes either do not form or do not become activated (i.e., cannot, or do not, bind oxygen) until the amine and metal are together exposed to water or water vapor. The ingredients of the complex can be mixed and used either free, or immobilized on or within a support inter alia, on or mixed with silicone rubber or with a polymer such as polyvinyl chloride ("PVC"), EVA, polypropylene ("PP"), PE or polyurethane (See, e.q., U.S. patent application Ser. No. 07/317,172, filed Feb. 28, 1989, the content of which is expressly incorporated herein by reference thereto, wherein one use for such complexes is as an oxygen scavenger in sealing compositions and structures for beer bottle crowns).

U.S. Pat. No. 4,287,995 discloses a sealing member for a container which is used to preserve aqueous liquids therein. This sealing member is mounted on the cap or stopper of the container on the portion facing the contents. The sealing member contains an oxygen adsorbent which is separated from contacting the contents of the container by a film which has a plurality of fine openings such that it is gas-permeable but water-impermeable at one atmosphere pressure.

U.S. Pat. No. 4,510,162 discloses an oxygen adsorbent composition comprising iron particles, yeast and moisture, which is mounted on a suitable carrier and adapted to be mounted in a closable container for removing oxygen therefrom.

U.S. Pat. No. 4,756,436 discloses a construction for an oxygen scavenging composition to be installed in a cap upon a liquid substance containing vessel. This construction includes an upper, vacant compartment, a lower compartment containing the oxygen scavenger, and a partition therebetween. The partition is made of single or plural sheets of gas permeable liquid-proof material to provide a barrier between the oxygen scavenger and the liquid substance.

Current crown liner technology includes the in situ molding of a thermoplastic liner material directly in the crown which will later be used for bottling beer or other beverages. Such liners are primarily made of PVC in the United States and of thermoplastics which do not contain chlorine (such as EVA or PE) in Europe and Japan. The manufacture of such crowns and liners is described below.

A conventional apparatus for making lined crowns is the Za-Matice Model ® 1400A (available from Zapata Industries, Inc.) described in U.S. Pat. Nos. 3,135,019, 3,360,827 and 3,577,595. The liner compositions may be based upon plastics such as, for example, PVC, EVA, or PE, and may include those of U.S. Pat. No. 3,547,746, for example. The Za-Matic ® 1400A machine is a shell lining machine which works as follows: the machine orients lacquered flat crown blanks (known as shells) with the lacquer side up (the lacquered side will become the inside of the finished crown). It feeds shells out of a hopper into a chute, from which the shells enter into a conveying turret which rotates.

The rotating turret and shells pass through the induction heating work coil of the machine. Induction heating raises the temperature of the shells to roughly 325 F. The shell, in turn, heats the inside lacquer coating to the same temperature. At this temperature, the polymer to be used as liner material will fuse tightly to any other similar material (e.g., the lacquer). As the hot shell travels with the turret, it passes under an extruder. The extruder takes the appropriate dry blend compound or pellets (generally of a polymer such as PVC, EVA or PE) into its intake end, and through the barrel of the extruder, wherein the compound is melted to the completely fused and fluxed stage (approximately 375 F) before it is extruded through a hole in the extender face plate. A rotating knife runs against the face plate in synchrony with the passing hot shells. As the extruded polymer comes out of the hole, the knife blade cuts off the extrusion and places it in the shell cavity. The hot pellet hits and sticks to the hot lacquer of the shell.

The turret continues to rotate, carrying the hot shell with the hot compound pellet in it to the second, or "molding" turret. The molding turret contains molding punch and anvil assemblies. These anvils are positioned so that each shell is carried into the flat surface of an anvil. The anvils are heated at all times to roughly 240 F. The molding turret centers each blank on an anvil, and the molding punch assembly is driven downwards to a set height. This compresses the hot compound in the hot shell to conform to the liner design of the molding tools. The compound and lacquer are at the proper temperature for fusion, thus bonding the molded liner to the interior lacquer of the hot shell. The molding punches are water-cooled to remain cold at all times. As the molding tools squeeze and mold the hot compound to the hot shells, the inward surface of the liner compound is being chilled to keep the compound from sticking to the molding punch and to chill or set the compound in its molded form. The finished crown is discharged down a chute onto an inspection belt.

In addition to this crown liner manufacturing method, which is generally used for PVC, EVA or PE liners, many other devices can apply liners by plastisol spin-lining or various hot molding techniques. PVC compositions, with or without additives as stabilizers or for imparting certain properties, are known in the art. For example, U.S. Pat. No. 4,380,597 discloses a stabilized thermoplastic composition of PVC (or mixed polymers) which may include ascorbates or gluconates as stabilizer additives. These stabilizers are added not to absorb oxygen from inside packages made of the polymer, but to prevent breakdown of the polymer itself. U.S. Pat. No. 4,211,681 discloses shaped articles (e.g., films or tubes) which include high molecular weight poly (ethylene oxide) polymers with stabilizers of ascorbic acid, 2,3-butyl hydroxyanisoles, and the like.

Japanese patent application 62-215,010 discloses a deodorizing fiber obtained by treating thermoplastic fibers with inorganic particles of divalent ferrous iron and L-ascorbic acid. U.S. Pat. No. 4,278,718 discloses a sealing composition for beverage containers consisting essentially of a vinyl chloride resin, a plasticizer, and a metal oxide.

Today there is a need for oxygen-scavenging thermoplastic compositions for use in oxygen-scavenging systems for packaging beverages, foods, pharmaceuticals and other products. The oxygen-scavengers in such systems should rapidly reduce oxygen levels within the package (and/or in the goods themselves), as well as prevent air (i.e., oxygen) ingress into the package. There is a particular need for such systems where the internal environment of the package is (or can become) wet or moist. Most advantageously, the oxygen-scavengers of such systems would remain inactive until after the product is packaged. One particular need for such a composition is a liner for beer bottle crowns wherein the oxygen-scavenging properties of the liner do not become active until after the bottle is crowned. The present invention provides certain compositions and formulations as solutions to these general needs, and specifically for bottled beverages including beer.

SUMMARY OF THE INVENTION

This invention teaches the preparation and use of certain oxygen scavenging materials dispersed in various carriers, such as polymers or plastics, and used in packaging as oxygen scavenging compositions. These compositions by virtue of novel and unexpected increases in oxygen uptake rates of the oxygen scavenging material, are useful in preventing deterioration or reaction of the packaged substances due to exposure to oxygen in the package.

The invention relates to oxygen scavenging compositions comprising a carrier, such as a polymer and preferably a thermoplastic polymer, which is permeable to oxygen and water or water vapor; and an oxygen scavenging material dispersed relatively uniformly through the carrier and added in an amount sufficient to act as an effective oxygen scavenger.

Preferably, the oxygen scavenging material is a transition metal complex or chelate of an organic polycarboxylic acid, preferably an amino polycarboxylic acid, and most preferably ethylene diamine tetracetic acid ("EDTA"), or a salt thereof. Other useful compounds include ethylene diamine triacetic acid, hydroxyethylene diamine triacetic acid, diethylene triamine pentaacetic acid or trans-1,2-diamino cyclohexane tetraacetic acid. It is also possible to utilize other polycarboxylic acids, such as citric and oxalic acids, which are capable of forming a chelate with the transition metal. Such polycarboxylic compounds may contain one or more amine, hydroxyl, carboxylate or sulfhydryl groups, or combinations thereof.

Preferably, the transition metal is chosen from iron, copper, cobalt, or nickel; most preferably it is either iron or copper. The transition metal used to make the chelate or complex may be supplied as a simple salt, such as iron or copper chloride, iron or copper sulfate, iron gluconate, nickel sulfate, or cobalt chloride.

It is also possible, and in some cases preferred, to include a reducing agent, such as an ascorbate compound, in the polymer in an amount sufficient to enhance, preserve or augment the oxygen scavenging properties of the amino polycarboxylic compound, chelate or complex. Ascorbic acid, in its D- or L- form, or a derivative, analog or salt thereof, may be used as a preferred reducing agent, since it has oxygen scavenging properties.

Preferred carriers include polyolefins, PVC, polyurethanes, polyamides and elastomers. PVC, EVA and PET are typically utilized, but PE, PP, and other olefins, various thermoplastic (or other) polyurethanes, elastomers (such as isoprene rubber, nitrile rubber, chloroprene rubber, silicone rubber, or other rubber analogs), and other thermoplastic materials such as chlorinated polyethylene ("CPE"), SURLYN TM, or various combinations or mixtures thereof, are acceptable In addition, coatings of epoxies, polyesters or other materials are useful as carriers for the oxygen scavenging compositions of the invention.

The most preferred polymers which may be used as the carrier (e.g., PVC, EVA, PE or polyurethane) are those which are permeable to water vapor at room temperature, so that exposure to elevated temperatures is not necessary to activate the oxygen scavenging capabilities of the composition. Advantageously, the oxygen scavenging material is maintained in a dry state. The oxygen scavenging material is uniformly dispersed in and throughout the polymer by a direct mixing technique. The oxygen scavenging capabilities of these materials are later activated by contact with water or water vapor which permeates into or through the carrier.

Another embodiment of the invention relates to a package (for, e.g., a foodstuff, beverage, or pharmaceutical product) comprising means for supporting or retaining the product, and an oxygen scavenging composition of an amino polycarboxylic acid chelate or complex of a transition metal (or salt thereof) in contact with the product (or in contact with the environment between the product and the package) for scavenging oxygen therefrom so as to avoid detrimental effects to the performance, odor or flavor properties of the product.

The oxygen scavenging composition may be present on an inside surface of the product supporting or retaining means. Such means can be in the form of a polymer film, with the oxygen scavenging composition being dispersed relatively uniformly throughout the polymer film. If desired, a plurality of polymer films may be used, with at least one layer of adhesive or binder therebetween, with the oxygen scavenging composition being present in at least one of the polymer films or layers, or in an adhesive layer. Also, the oxygen scavenging composition can be applied as a coating or lining upon the inside surface of the product supporting or retaining means to function as a barrier to oxygen permeation.

The invention also relates to containers for water-containing foodstuff, beverage, chemical or pharmaceutical products comprising means for retaining the product and having at least one opening therein for filling or dispensing of the product; a member for closing the opening and preventing escape of the liquid product when not desired; and a liner or gasket comprising one of the oxygen scavenging compositions described above and being positioned adjacent to the closing member. Preferably, the retaining means is a bottle, the closing member is a crown or closure, and the polymer of the liner or gasket comprises polyurethane, PVC, EVA or PE. The retaining means may also be a metal can or glass jar, with the closing member being a lid therefore. In this variation, the oxygen scavenging composition may be applied to the lid in the form of a ring, a spot, or coating. Also, the oxygen scavenging composition may be applied to the interior of the can as a coating, generally of a polymeric carrier. When a ferrous metal can is used, it is usually provided with a seam. Thus, it is desirable to apply the oxygen scavenging compositions of the invention as or incorporated into a sealant in or upon the seam to prevent oxygen ingress into the can through the seam. Another embodiment of the invention relates to an oxygen scavenging container which may be made from any one of the compositions of the invention described above.

DETAILED DESCRIPTION OF THE INVENTION

Figure 1:
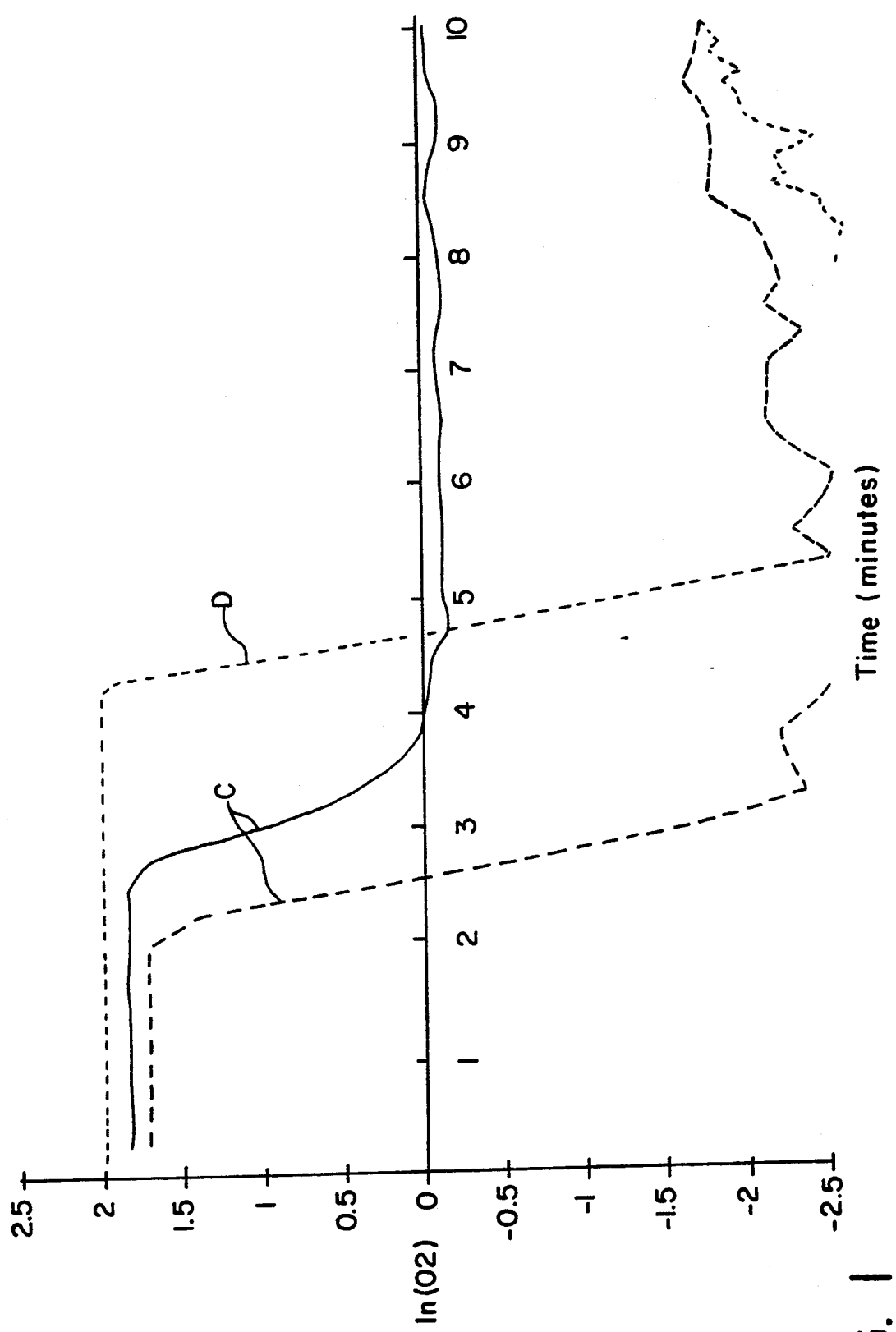
FIGS. 1-3 are graphical representations of the reduction in oxygen concentration over time for aqueous solutions which include therein certain oxygen scavenging materials in accordance with the invention.

The oxygen scavenging compositions of the invention include certain preferred combinations of oxygen scavenging materials which are added to and dispersed in and throughout a polymer carrier for these agents.

A wide variety of polycarboxylic acid chelates or complexes of transition metals can be used in the formulations of this invention. Amino polycarboxylates, such as EDTA, and other polycarboxylates, optionally containing hydroxyl moieties, are representative examples of preferred compounds which can be complexed with the transition metal ion. Hydroxyethylene diamine triacetic acid, diethylene triamine pentaacetic acid, or trans-1,2-diamino cyclohexane tetraacetic acid can also be used as suitable amino polycarboxylic compounds. Other transition metal chelates containing one or more amine, hydroxyl, carboxylate or sulfhydryl groups, or combinations thereof, may also be used.

The most preferred oxygen scavenging materials include the iron complexes of ethylene diamine tetraacetic acid ("EDTA") or sodium salts thereof. $Fe^{++}/EDTA/(2Na+)$ is the most preferred chelate. This material is dispersed relatively uniformly throughout the polymer and is activated by contact with water or water vapor which permeates the polymer.

A wide variety of polymers (or mixtures thereof) may be used in accordance with the teachings of the present invention. For use in applications such as crown or closure liners, the polymer is preferably a thermoplastic, such as PVC, EVA, PET, PE or PP, or a polyurethane. As noted above, PVC liners are well known for use in crowns as described in the production of same utilizing the Za-Matic machines. There is also well-known technology for making aluminum or plastic closures containing EVA liners. Thus, one of the preferred uses of the compositions of the inventions is as a liner or gasket in a crown or closure for capping a beverage bottle.

In addition to its use as a crown or closure liner, the compositions of the invention may also be used in the form of a film for packaging materials. Such films are preferably made of PE, PP, PVC, or SURLYN TM, a DuPont Corporation polymer. The oxygen scavenging compositions of the invention could also be used for forming containers; in this situation the polymer is preferably PET, PVC, or PE. Other polymers which are contemplated by the invention include silicones as well as elastomers such as isoprene rubber and its rubber-like analogs: nitrile rubber, chloroprene, EPDM, etc. Silicone rubber can also be used in some situations. The only requirements of the polymer are that it can be processed in a manner which allows the amino polycarboxylic acid - transition metal complex to be dispersed relatively uniformly throughout and that the polymer be permeable to oxygen and water or water vapor. Where water is not present in the foodstuff, the carrier material may be pre-moistened prior to use or certain compounds may be added which generate water or moisture from contact with oxygen.

Another application of the compositions of the invention would be as a sachet, packet or pellet which is mounted on a support and then attached to a crown or other container lid in the form of an article, such as a ring or spot, or as a coating. Thus, the compositions can be applied to a wide variety of jar lids and caps which are used for retaining food substances therein. Again, however, the preferred uses of the compositions of the invention are in connection with foodstuffs which contain water so that the amino polycarboxylic acid-transition metal complex may be activated by contact with water or water vapor from the foodstuff which permeates into the polymer.

Other uses for the compositions of the invention include use on metal (e.g., aluminum or tinplate) cans for beverages. In these cans, the lid is attached by a seam, and a sealant compound is used in the seam to prevent the ingress of air into the can. The oxygen scavenging compositions of the invention may be applied to this seam as or incorporated into the sealant. Tinplate cans also contain a sideseam and the compositions may be applied there as well.

It is also contemplated to prepare plastic bottles from the compositions of the invention. In particular, PVC and PET are the preferred polymers for this embodiment, and the oxygen scavenging compound and catalyzing agent would be dispersed uniformly throughout the PVC or PET resin. Thereafter, the bottles can be molded in conventional manners well known in the art.

Another preferred use of the composition of the invention is as a gasket or liner applied to an aluminum or plastic closure or metal crown for plastic or glass bottles.

For crown liner manufacture, the disclosure of U.S. Pat. No. 3,547,746 is useful and thus is expressly incorporated herein by reference thereto. The thermoplastic resins which are preferred for use as the polymer in the oxygen scavenging compositions of the invention are set forth in that patent at column 2, lines 35 through 47.

The '746 patent also discloses suitable plasticizer compounds which may be used with the thermoplastic resin along with preferred ranges thereof. In this invention, it is preferred to use an amount of plasticizer ranging from about 60 to 90 parts by weight based on 100 parts by weight of the polymer for crown liners. Depending upon the specific product to be made, the amount of plasticizer can vary from 10 to 120 parts. Specific plasticizers for PVC crown liners are recited in column 5, lines 49 through 53 of the '746 patent. Other conventional additives such as stabilizers, lubricants, pigments, etc. are well known in the art and may optionally be used in the compositions of the present invention.

In these formulations, it is preferred to use an amount of oxygen scavenging compound ranging from about 0.1 to 20, preferably 1 to 12 parts by weight based on a 100 parts by weight of the polymer (i.e., between 10 and 1000, and preferably 50 and 600 $\mu$ moles of scavenger compound per gram of polymer for compounds having molecular weights of between 200 and 500 grams per mole).

If desired, a PAPA chelate or macrocyclic chelate of a transition metal ion can be used in the compositions of this invention to augment the oxygen scavenging properties of the amino polycarboxylic acid - transition metal complex. As an augmenter, such chelates would be used in an amount of between about 0.3 and 33 and preferably, 2.5 to 15 parts per weight based on 100 parts by weight of the polymer (i.e., between 10 and 500, and preferably 50 to 300, $\mu$ moles per gram of polymer). Preferred transition metal chelates include polyalkyl polyamines or macrocyclic amine chelates of 5 transition metal ions such as iron, copper, nickel or cobalt. In these polyalkyl polyamine chelates, equal length carbon chains are utilized between adjacent nitrogen atoms, preferably those chains having between 1 and 4 and optimally 2 carbon atoms.

Ascorbate compounds may also be used as preservatives for the amino polycarboxylic chelates or complexes. The term ascorbate compound is used to include ascorbic acid in either its D or L form and any derivative, analog or salt thereof, including erythorbic acid. In particular, D- or L- ascorbic acid or salts thereof, particularly the sodium salts, are preferred for use in this invention, since these materials are widely accepted for contact with food and have achieved GRAS status (i.e., generally recognized as safe) with the U.S. Food and Drug Administration for such applications. Such ascorbates may be used in quantities sufficient to augment the oxygen-scavenging capabilities of the present invention.

In another embodiment of the invention, the oxygen scavenging material may be treated to maintain these agents in a dry state before they are dispersed relatively uniformly throughout the polymer. Numerous methods are known for maintaining this dry state: freeze drying, spray drying, or microencapsulation are preferred due to simplicity of processing. Thereafter, the oxygen scavenging compound will be activated by contact with water or water vapor which permeates into the polymer.

Techniques for freeze drying are well known in the art. In the present invention, the oxygen scavenging material is mixed in a flask under an inert gas atmosphere with deoxygenated water to form a solution, the solution is frozen and the frozen solution is then freeze dried (using, e.g., a Labconco 77520 benchtop freeze dryer or commercial large-scale system) until all water is removed. The freeze dried material is then dispersed throughout the polymer prior to processing the polymer into the final configuration.

Microencapsulation techniques are also well known in the art. The oxygen scavenging material is enclosed within microcapsules that are relatively impervious to oxygen and/or water vapor. The encapsulating material is selected to provide the desired properties to the oxygen scavenging material. If the encapsulating material is permeable to water or water vapor, the encapsulated material must be maintained in a dry environment until the time of use. In contrast, an oxygen and water impervious encapsulant may be used for compositions whereby later processing of the polymer causes physical rupture of the microcapsules and exposure of the oxygen scavenging agent to the oxygen and water or water vapor which permeates the polymer. One skilled in the art can select the appropriate encapsulant for the intended application.

By appropriate selection of the encapsulating material, one may protect the enclosed oxygen scavenging compound from the oxygen in air; this would allow longer storage of the prepared oxygen scavenger. If the encapsulating material is pervious to water or water vapor, the problem of maintaining the oxygen scavenger in an inactive form is reduced to a problem of maintaining the microencapsulated material in a dry container. Such a preparation might be advantageously used when the polymer/scavenger mixture is to be prepared and used immediately, particularly where the preparation method (e.g., direct blending) lends itself to physical rupture of the microcapsules, thereby opening the contents to possible contact with water or water vapor, thus activating the oxygen scavenging properties of the contained compound.

After freeze drying, spray drying, or microencapsulation, the materials are then blended with the appropriate polymer and manufactured into the final composition, form and configuration for use in, on or as the product packaging.

One way of distributing the oxygen scavenging material throughout the carrier is by preparing direct blend polymers. Beads of a polymer carrier, such as polyvinyl chloride, are placed between the rollers of a polymer forming mill operating at about 300 degrees. The back roll of the mill operates at a higher velocity than the front roll. Both of the rolls spin in opposite directions, so that the beads are sheared downward therebetween. As the polymer beads become fluid they spread across the front roll at the thickness set between the rolls.

After the PVC has become heated and softened, the compounds to be blended into the polymer are slowly poured into the space between the rollers. The mix of PVC and compound is then achieved by cutting the polymer to the center of the mill and then allowing it to spread back out over the roller. This is done 20-30 times until the compounds are well mixed. The polymer is then cut horizontally as it passes over the roller and is pulled from the mill.

EXAMPLES

The following examples illustrate the preferred embodiments of the invention. In each example, the formulation components are designated in parts by weight unless otherwise indicated.

EXAMPLE 1

Procedure for Oxygen Measurement using Gas Sampling Tubes and a Gas Chromatograph/Mass Spectrometer A known weight (generally 1 gram) of polymer or material to be tested is introduced into a 250 ml gas sampling tube. New O-ring seals and septum are used for each speciment. The gas tube is then flushed with the standard gas until the tube is filled with standard gas. The gas tube is allowed to sit 1 hour and then is connected to the system. Two or three samples of gas are loaded from the tube into the gas chromatograph to check for leaks and to establish a baseline oxygen/nitrogen ratio. If the tube is stable and no leaks are detected, a specified amount of distilled water is introduced into the tube, generally 0.5-1 ml, so as to provide about 110 $\mu$ moles of oxygen in the tube. The gas mixture in the tube is sampled periodically, loaded onto the gas chromatograph and evaluated for oxygen concentration.

EXAMPLE 2

Preparation of Freeze-Dried EDTA/Fe(II)

A first Erlenmeyer flask containing a magnetic stir bar is filled with deionized water and corked. The water in the flask is stirred on a magnetic stir plate and flushed with a moderate flow of argon gas for ¼ hour until the dissolved oxygen in the water is displaced.

Ethylene diamine tetraacetic acid (EDTA) disodium salt dihydrate and ferrous chloride tetrahydrate, 1:1 mole/mole, are placed in a second Erlenmeyer flask, which also contains a magnetic stir bar. The second flask is flushed with argon gas for ten minutes.

The deoxygenated water in the first flask is then introduced into the second flask (containing the EDTA and ferrous chloride) until the desired amount of liquid has been transferred. The contents are kept under argon, the solution is stirred on a magnetic stir plate, and the pH is adjusted to 5 with 10M deoxygenated sodium hydroxide.

The solution is then transferred to an argon flushed lyophilization flask and is frozen in liquid nitrogen. The frozen solution is then lyophilized until all water has been removed. Oxygen-contaminated solutions are detectable by a color change from a light green to a red-orange color.

EXAMPLE 3

Proof of Principle

To demonstrate the unexpected advantages of the present invention, the following compositions were prepared and tested.

Experimental samples were prepared as a PVC dry blend containing the oxygen scavenging material of Example 2 using techniques known to one skilled in the art. This dry blend was then rolled into a film of about 0.02 to 0.04 inches thick. Samples were then cut and weighed from this sheet for introduction into the gas sampling tubes for oxygen uptake measurements.

One gram samples were used in the following experiments. 150 micromoles of the oxygen scavenger $Fe^{++}$ + EDTA/2$Na^+$ per gram of PVC were used in sample A, while 250 micromoles per gram were used in sample B. The oxygen concentration in the sampling tube was measured relative to an argon internal standard. Results are shown in the following table.

| Sample | Time | % change $O_2/Ar$ |
|---|---|---|
| A | initial | −.567 |
|   | 1.5 hr. | 5.816 |
|   | 24 hrs. | 13.333 |
| B | initial | −0.567 |
|   | 1.5 hr. | 6.099 |
|   | 24 hrs. | 14.610 |

The increase in the percent change of the $O_2/Ar$ ratio over time demonstrates that the amount of oxygen in the tube is decreasing. This decrease is rapid for the first 1.5 hours and continues throughout the entire 24 hour duration of the test.

EXAMPLE 4

To further illustrate the oxygen scavenging abilities of the polycarboxylic acid transition metal chelates of the inventions, the following test was conducted for samples of various polycarboxylic acids complexes. The samples were introduced into a reaction vessel containing water, and extraction of oxygen from the water is measured with conventional instrumentation.

The following samples were prepared:

| Sample | Description |
|---|---|
| C | EDTA, ferrous chloride |
| D | EDTA/ferrous ion complex |
| E | hydroxy-EDTA, ferrous chloride |
| F | hydroxy-EDTA/ferrous ion complex |
| G | diethylene triamine pentaacetic acid ("DTPA"), ferrous chloride |
| H | DTPA/ferrous ion complex |

For samples C, E and G, the components are added separately and the complex was formed in situ in the solution, while samples D, F and H were added as a pre-formed complex. Equal quantities of each sample were prepared and were mixed into the water in the reactor.

Figure 2:
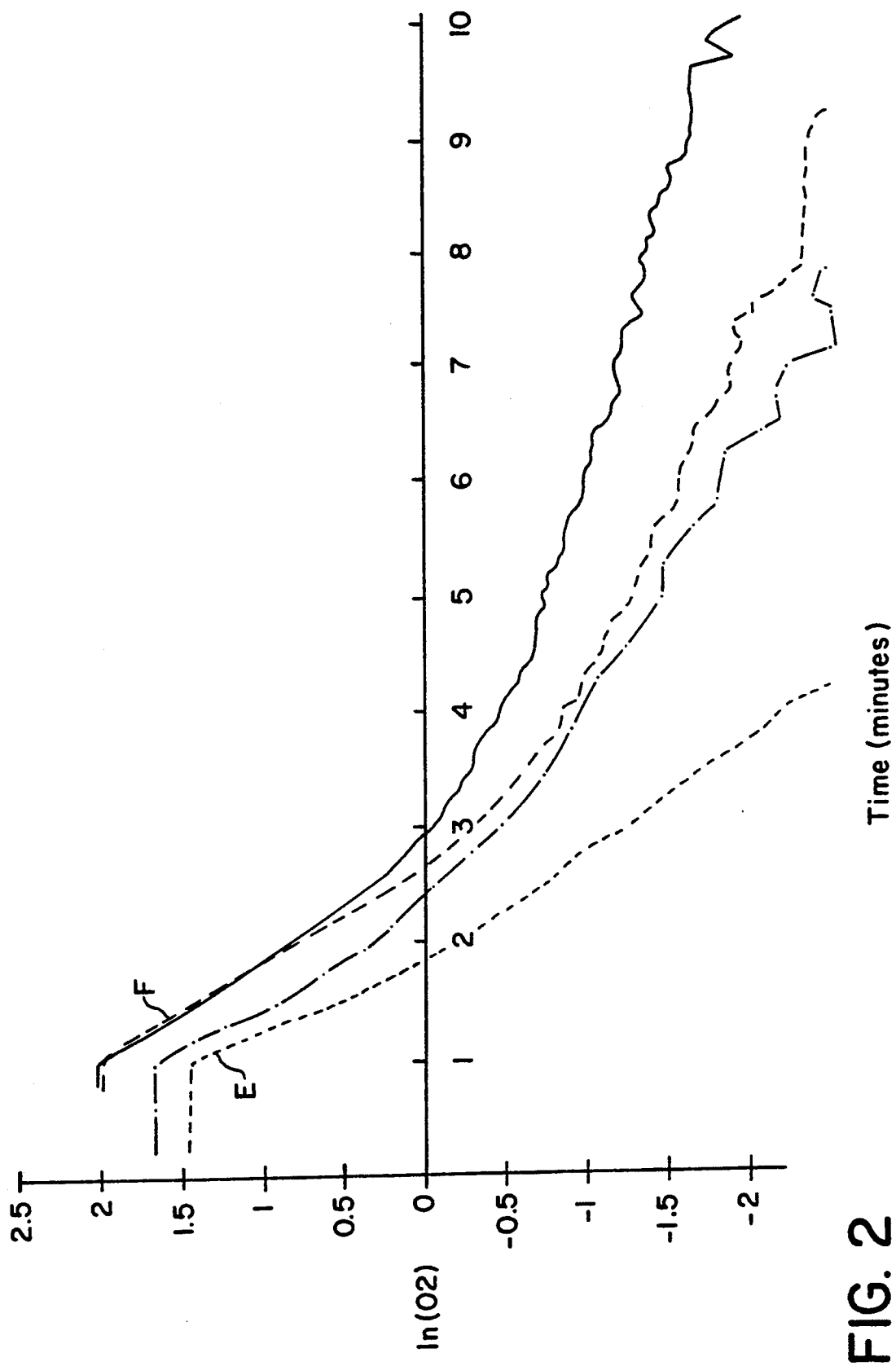
Figure 3:
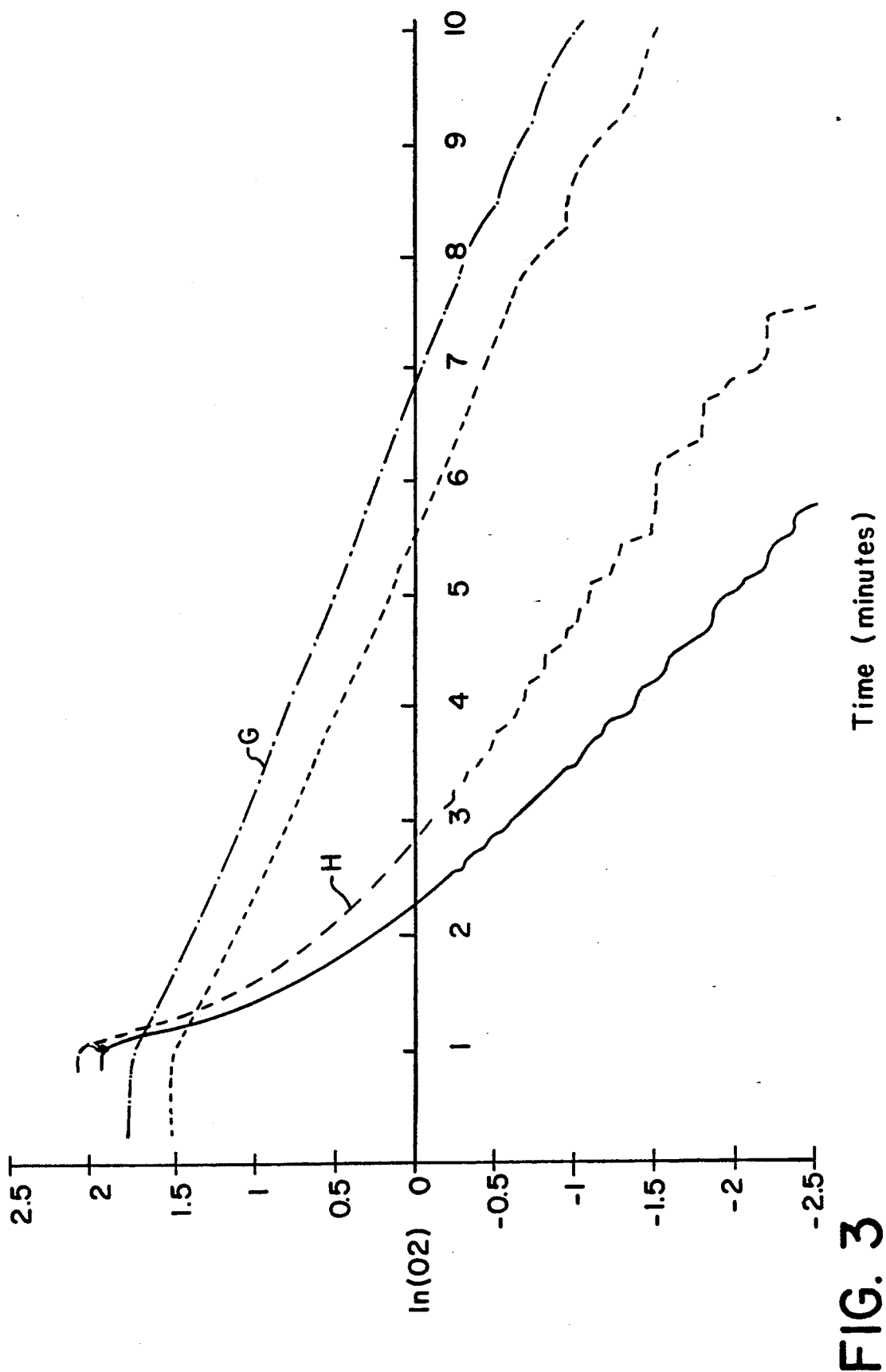

The results are illustrated in the attached drawing figures. Results for samples C and D are shown in FIG. 1, E and F in FIG. 2, and G and H in FIG. 3. These results show significant reductions in measured oxygen concentration over time after the introduction of the materials into the aqueous solution.

EXAMPLE 5

A standard PVC lining compound was heated and mixed on a two roll mill via standard practice.

When the proper degree of fluidity was reached, the oxygen scavenging ingredients were added and mixed into the compound. Sheets of compound were removed from the mill, cooled, and cut into pieces small enough to fit into the gas cell, in the manner described in Example 1. Results are as follows:

| CELL LOADING, ONE GRAM COMPOUND ($\mu$MOLES FERROUS EDTA/ $\mu$MOLES SODIUM ASCORBATE | OXYGEN SCAVENGED $\mu$MOLE/DAY) |
|---|---|
| 0/0 | 1.2 |
| 0/101 | 1.8 |
| 0/252 | 4.0 |
| 0/353 | 4.3 |
| 46/0 | 7.0 |
| 131/0 | 14.4 |
| 209/0 | 17.4 |
| 21/127 | 10.3 |
| 21/208 | 14.1 |
| 42/85 | 12.1 |
| 42/163 | 16.8 |
| 41/245 | 22.2 |
| 2/124 | 14.8 |
| 62/208 | 20.0 |
| 83/83 | 16.5 |
| 82/163 | 21.2 |
| 80/240 | 26.0 |
| 123/123 | 24.8 |
| 156/156 | 30.4 |

The data shows that a standard PVC lining compound will react to a small extent with oxygen. The addition of only sodium ascorbate (i.e., without a source of transition metal) very slightly increases the reactivity. Ferrous EDTA has a significant effect on the amount of oxygen scavenged. The combination of ferrous EDTA and sodium ascorbate, however, causes a disproportionate increase in oxygen scavenged. Both ferrous EDTA by itself and in conjunction with sodium ascorbate demonstrate significant oxygen removal.

EXAMPLE 6

The procedure used in Example 5 was employed to demonstrate that ferric salts of EDTA are effective in conjunction with a reducing agent such as sodium ascorbate.

| CELL LOADING, ONE GRAM COMPOUND (µMOLES FERROUS EDTA/ µMOLES SODIUM ASCORBATE | OXYGEN SCAVENGED µMOLES/DAY |
| --- | --- |
| 270/0 | 2.2 |
| 86/86 | 16.1 |
| 125/125 | 23.8 |

The data shows that ferric EDTA by itself is relatively ineffective in scavenging oxygen. It is very effective, however, when used with a reducing agent such as sodium ascorbate.

EXAMPLE 7

A trial was performed to demonstrate the effectiveness of liners containing oxygen scavengers on bottled beer. Since the most consistent bottling is performed on commercial bottling lines, crowns to be tested were marked and added to the hopper of an operating beer-bottle crowning line. Bottles crowned with control and experimental crowns were collected prior to and after pasteurization. Measurements were conducted on post-pasteurization samples; additional pasteurized samples were stored at room temperature for later measurements. Ideally, this gives data with respect to the particular bottling line on the status of oxygen in the package just after pasteurization, and after periods of storage. Nitrogen and oxygen measurements were made by piercing the crown with a modified Zahm-Nagel device, removing the carbon dioxide with a pre-column on the gas chromatograph, conveying the remaining gases (nitrogen and oxygen) to a mass selective detector, and monitoring the nitrogen and oxygen peaks. Head space was then measured by replacing the gas with water and weighing. The total package content of nitrogen and oxygen was calculated. Nitrogen was measured to detect leaking bottles.

| CROWN LINER COMPOSITION | TIME AFTER PASTEURIZATION | TOTAL PPB OXYGEN PER BOTTLE |
| --- | --- | --- |
| 0 µmole iron EDTA/ | 1 day | 945 |
| 0 µmole sodium | 8 days | 287 |
| ascorbate | 15 days | 127 |
| 150 µmoles ferric EDTA/ | 1 day | 627 |
| 150 µmoles sodium | 8 days | 18 |
| ascorbate | 15 days | 0 |
| 250 µmoles ferrous EDTA/ | 1 day | 610 |
| 250 µmoles sodium | 8 days | 13 |
| ascorbate | 15 days | 0 |

The data demonstrates that oxygen is trapped in the package during crowning, and that beer reacts with that oxygen. The crowns containing oxygen scavenging liners reduce the amount of oxygen in the bottle; thus reducing the amount available to react with beer.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. An oxygen scavenging composition comprising a carrier which is permeable to both oxygen and water or water vapor and an oxygen scavening material consisting essentially of a transition metal chelate or complex of an amino polycarboxylic acid, or a salt thereof, dispersed relatively uniformly throughout the carrier in an amount effective to act as an oxygen scavenger, wherein the transition metal amino polycarboxylic acid chelate or complex is activated for scavenging oxygen by contact with water or water vapor which is present in or permeates into the carrier.

2. The composition of claim 1 wherein the amino polycarboxylic acid is selected from the group consisting of ethylene diamine tetraacetic acid, ethylene diamine triacetic acid, hydroxy ethylene diamine triacetic acid diethylene triamine pentaacetic acid, and trans-1,2-diamino cyclohexane tetraacetic acid.

3. An oxygen scavenging composition comprising a carrier which is permeable to both oxygen and water or water vapor and an oxygen scavenging material consisting essentially of a transition metal chelate or complex of an amino polycarboxylic acid, or a salt thereof, and a reducing agent for increasing the effectiveness of the amino polycarboxylic acid transition metal chelate or complex, said oxygen scavenging material dispersed relatively uniformly through the carrier in an amount effective to act as an oxygen scavenger, wherein the amino transition metal polycarboxylic acid chelate or complex is activated for scavenging oxygen by contact with water or water vapor which is present in or permeates into the carrier.

4. The composition of claim 1 wherein the carrier is selected from the group consisting of a polyolefin, polyvinyl chloride, polyurethane, an elastomer, and a mixture thereof.

5. The composition of claim 1 wherein the transition metal used to form the complex of chelate is selected from the group consisting of iron or copper chloride, iron or copper sulfate, iron gluconate, nickel sulfate and cobalt chloride.

6. The composition of claim 1 wherein the oxygen scavenging material has been treated to be in a dry state.

7. The composition of claim 1 wherein the polycarboxylic acid transition metal chelate or complex is present in an amount of about 0.1 to 20 parts by weight based on 100 parts by weight of the carrier.

8. The composition of claim 1 wherein the polycarboxylic acid transition metal chelate or complex is present in an amount of about 100 to 1000 µ moles per gram carrier.

9. The composition of claim 1 wherein the transition metal is selected from the group consisting of iron, copper, nickel and cobalt.

10. The composition of claim 9 wherein the amino polycarboxylic acid transition metal chelate or complex has been treated to be in a dry state.

11. The composition of claim 6 or 10 wherein the dry state is achieved by freeze drying, spray drying or microencapsulation.

12. An oxygen scavenging composition comprising a carrier which is permeable to both oxygen and water or water vapor and an oxygen scavenging material consisting essentially of a transition metal chelate or complex of an amino polycarboxylic acid, or a salt thereof, and an ascorbate compound in an amount sufficient to preserve or augment the oxygen scavenging properties of the amino polycarboxylic acid transition metal chelate or complex, said oxygen scavenging material dispersed relatively uniformly throughout the carrier in an amount effective to act as an oxygen scavenger, wherein the amino transition metal polycarboxylic acid chelate or complex is activated for scavenging oxygen by contact with water or water vapor which is present in or permeates into the carrier.

13. The composition of claim 12 wherein the ascorbate compound is D- or L- ascorbic acid or a salt thereof.

14. An oxygen scavenging composition comprising a polymer which is permeable to both oyxgen and water or water vapor; and an oxygen scavenging material comprising a transition metal chelate or complex of an amino polycarboxylic acid, or a salt thereof, dispersed relatively uniformly throughout the polymer in an amount effective to act as an oxygen scavenger; wherein the transition metal amino polycarboxylic acid chelate or complex is activated for scavenging oxygen by contact with water or water vapor which is present in or permeates into the polymer.

15. The composition of claim 14 wherein the transition metal is selected from the group consisting of iron, copper, nickel and cobalt, and wherein the polymer is selected from the group consisting of polyolefin, polyvinyl chloride, polyurethane, polyamide, an elastomer, and mixtures thereof.

16. The composition of claim 14 wherein the amino polycarboxylic acid transition metal chelate or complex is present in an amount of about 0.1 to 20 parts by weight based on 100 parts by weight of the polymer.

17. The composition of claim 14 wherein the polymer is selected from the group consisting of polyvinyl chloride, ethylene vinyl acetate, polyethylene, chlorinated polyethylene, a polyurethane and polyethylene terephthalate, and the amount of amino polycarboxylic acid transition metal chelate or complex is about 0.1 to 12 parts by weight based on 100 parts by weight of the polymer.

18. The composition of claim 17 further comprising a plasticizer in an amount of 10 to 120 parts by weight based on 100 parts by weight of the polymer.

19. The composition of claim 14 wherein the amino polycarboxylic acid is ethylene diamine tetraacetic acid.

20. The composition of claim 19 wherein the amino polycarboxylic acid transition metal chelate or complex is selected from the group consisting of sodium, potassium and calcium salt, and further comprising a reducing agent for increasing the effectiveness of the polycarboxylic acid transition metal chelate or complex.

21. The composition of claim 19 wherein the amino polycarboxylic acid transition metal chelate or complex has been treated to be in a dry state.

22. The composition of claim 21 wherein the dry state is achieved by freeze drying, spray drying or microencapsulation.

23. An oxygen scavenging composition comprising a polymer which is permeable to both oxygen and water or water vapor and an oxygen scavenging material consisting essentially of a transition metal complex or chelate of ethylene diamine tetraacetic acid, or a salt thereof, dispersed relatively uniformly throughout the polymer in an amount effective to act as an oxygen scavenger, and an ascorbate compound in an amount sufficient to preserve or augment the oxygen scavenging properties of the complex of chelate, wherein the complex or chelate is activated for scavenging oxygen by contact with water or water vapor which is present in or permeates into the polymer.

* * * * *